(12) United States Patent
Kolsrud

(10) Patent No.: US 7,039,386 B2
(45) Date of Patent: May 2, 2006

(54) CELLULAR BASE STATION BROADCAST METHOD AND SYSTEM

(75) Inventor: Arild Kolsrud, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 449 days.

(21) Appl. No.: 10/124,297

(22) Filed: Apr. 18, 2002

(65) Prior Publication Data

US 2004/0203562 A1   Oct. 14, 2004

(51) Int. Cl.
*H04Q 7/20* (2006.01)

(52) U.S. Cl. ............... 455/404.1; 455/412.1; 455/567

(58) Field of Classification Search ............ 455/404.1, 455/414.1, 414.3, 567, 412.2; 370/444, 338, 370/455; 340/286.02, 539.11, 531, 7.48; 379/37, 48, 68, 72, 46, 51
See application file for complete search history.

(56) References Cited

U.S. PATENT DOCUMENTS

| | | | |
|---|---|---|---|
| 5,166,972 A * | 11/1992 | Smith | 379/49 |
| 6,161,016 A * | 12/2000 | Yarwood | 455/445 |
| 6,329,904 B1 * | 12/2001 | Lamb | 340/286.02 |
| 6,462,665 B1 * | 10/2002 | Tarlton et al. | 340/601 |
| 6,873,837 B1 * | 3/2005 | Yoshioka et al. | 455/321 |
| 2002/0008635 A1 * | 1/2002 | Ewing et al. | 340/902 |
| 2002/0176545 A1 * | 11/2002 | Schweitzer | 379/37 |
| 2002/0184346 A1 * | 12/2002 | Mani | 709/220 |
| 2003/0069002 A1 * | 4/2003 | Hunter et al. | 455/404 |
| 2003/0164775 A1 * | 9/2003 | Hutchison et al. | 340/902 |

* cited by examiner

*Primary Examiner*—Jean Gelin

(57) ABSTRACT

In the method, an emergency broadcast station receives report of an impending or current disaster-related situation from a local authority. The geographic area to be affected by the impending or current disaster-related situation is served by an existing communication system, such as a cellular network. The emergency broadcast station generates a signal representing an emergency broadcast message that contains a frequency of an accessible main emergency channel at the emergency broadcast station, and a priority level classifying the emergent or impending disaster-related situation. The signal is transmitted to one or base stations, each serving a plurality of users of the system, which in turn send the signal to the users. The users tune to the frequency of the channel to receive the emergency broadcast message.

16 Claims, 4 Drawing Sheets

CELLULAR BASE STATION BROADCAST METHOD AND SYSTEM

BACKGROUND OF THE INVENTION

1. Field of the Invention

The present invention generally relates to cellular communications and more particularly to a method and system for efficiently distributing emergency warning messages to users of the system.

2. Description of Related Art

In recent years, cellular phone use has become widespread throughout the world. A cellular communication system includes a plurality of geographic sub-areas or cells. Each cell has a corresponding base station for providing communication services to wireless mobile stations located in that cell. With advancing technologies in cellular communications, and given the miniaturization and mass productions of components for cell phones, cell phone cost has been dramatically reduced such that most of the world population owns or has access to a cellular phone.

Every year, regions throughout the world are subject to some of nature's worst natural disasters, where massive damage is received due to naturally occurring or human-inflicted disaster conditions such as earthquakes, tornadoes, hurricanes, volcanic eruptions, civil wars, terrorist activities and the like. Despite the development of the "information superhighway" that marks the advancing communication age that we live in, entire communities of people are still injured or perish in those regions that are subject to these natural or human-inflicted disasters.

Although many developed countries have national emergency broadcast systems which televise impending or current public emergencies over television, cable and/or radio networks, historical experience has proven that these current warning methods still have significant difficulties in reaching masses of people who do not own a TV or radio. Moreover, many citizens of lesser-developed or third-world countries have the means to own or access cell phones, even where such countries or regions employ no national early warning system, or where the citizens have no communication medium other than the cell phone.

SUMMARY OF THE INVENTION

The present invention provides a cellular communication method and cellular communication system to efficiently distribute emergency warning messages to mass numbers of people in geographic areas served by the system that are near or within an emergent or sudden disaster-related situation. In the method, an independent emergency broadcast station receives a report of an impending or current disaster-related situation from an authority. The geographic area is served by an existing cellular communication system, such as a cellular network. The emergency broadcast station generates a signal representing an emergency broadcast message that is received by the cellular communication system. The cellular communication system responds to the signal by sending emergency information to base stations in cells that serve users of the system.

In one embodiment, the emergency information may include a frequency of an accessible main emergency channel at the emergency broadcast station, and a priority level classifying the current or impending disaster-related situation. The emergency information is transmitted to at least one or more base stations of the system that are near or within the projected disaster area, each serving a plurality of users of the system. The users tune to the frequency of the channel to receive the emergency broadcast message. Accordingly, the proposed method and system helps distribute emergency broadcasts and warnings in case of an emergent public emergency to mass subscribers of the system by utilizing an already-existing cellular network of mobile phone cells.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

In accordance with the invention, there is provided a method and system for efficiently delivering early-warning, emergency broadcast messages to masses of people by utilizing an existing cellular network. In an embodiment, the system includes an existing cellular network having one or more base stations, each serving a plurality of mobile cell phones within a designated cell of the network. The base stations do not transmit the emergency broadcast message itself, but send a signal representing the emergency broadcast message to users served by the base station. The signal contains information that classifies a priority level of the disaster situation, and contains the frequency at which the message is transmitted from an independent AM transmitter at the emergency broadcast station. The user, which in an embodiment of the invention is the aforementioned cellular phone, then tunes to the channel in order to receive the information, which can either be voice or data. This proposed solution should help increase the capability of a national or public emergency broadcast warning system to alert great masses of people by utilizing an already existing network of mobile phone cells.

The cellular phones should be able to tune in and demodulate a low MHz AM signal, such as an AM signal between 600 kHz to a few MHz. This is because the range of an AM signal is longer. But, this present invention is not limited to AM signal, This can be easily and inexpensively accomplished by adding a minimum number of additional components in the cellular phone. For example, a known AM broadcast receiver chip, costing only a few cents on the dollar, may be added to the circuit board of the cellular phone. Alternatively, the main processing chip in the cell phone could be configured to handle reception of AM or FM transmissions, since only a handful of additional transistors are required. The remaining changes may be effected by making software modification to the existing software in the phone, such as adding applications and or algorithms that identify the aforementioned priority levels and frequency as indications of an incoming emergency signal.

Figure 1:
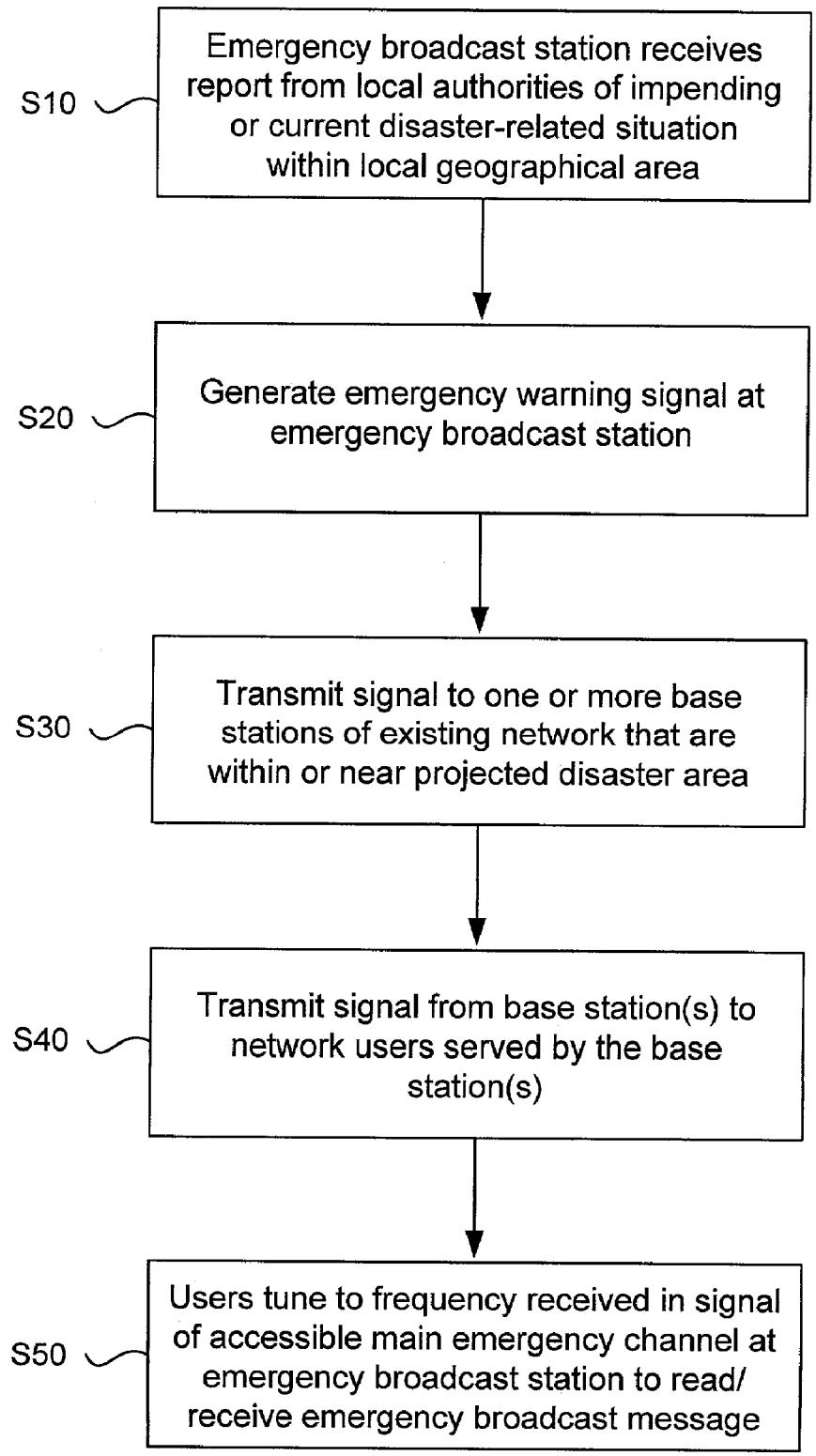
FIG. 1 is a flowchart illustrating the method in accordance with an exemplary embodiment of the invention.

FIG. 1 is a flowchart illustrating the method in accordance with an exemplary embodiment of the invention. Referring to FIG. 1, at the onset of a natural or human-inflicted disaster, a local authority sends a report (step S10) to an emergency broadcast station located within or near the local authority. The local authority may be a national, state or municipal government for example. The emergency broadcast station receives a report of the impending or current disaster-related situation occurring near or within the local geographical area.

The emergency broadcast station then locally generates an emergency broadcast message (step S20) containing information on the emergent natural or human-inflicted disaster. The emergency broadcast system then transmits a signal (step S30) to one or more base stations in the network that are near or within the projected disaster area. The signal represents the emergency broadcast message and contains priority level information that classifies the priority level of the disaster, as well as a frequency of an accessible main emergency channel at the emergency broadcast station. Each base station receiving the signal in turn transmits the signal (step S40) to all mobile cellular phones that it is serving. The users of the mobile cellular phones then tune their cellular phones to the frequency of the main emergency channel at the emergency broadcast station (step S50) in order to read or receive the necessary emergency broadcast information; thus, enabling the cell phone owner to avert or avoid the impending or current disaster.

Figure 2:
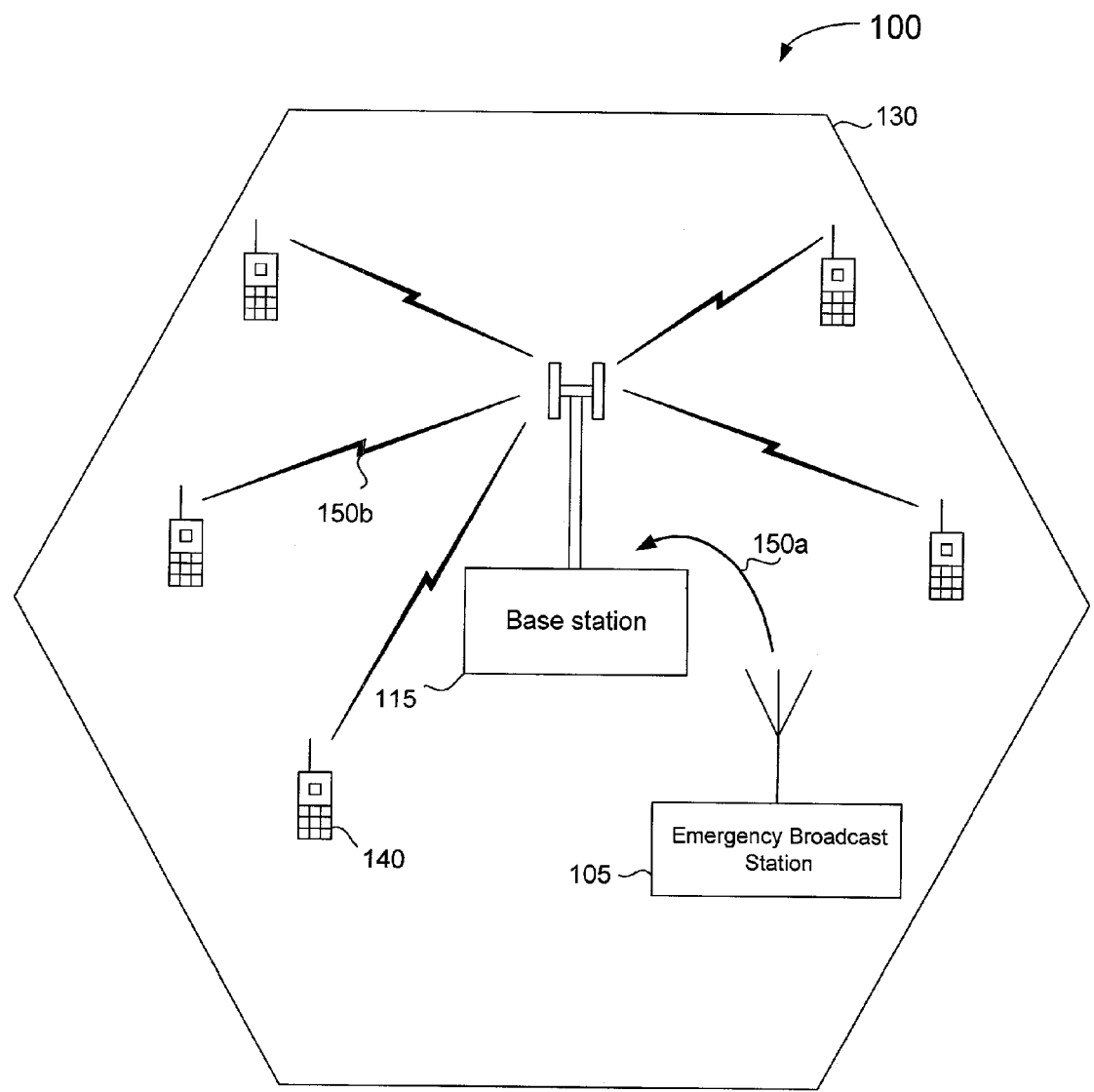
FIG. 2 is a block diagram of an exemplary communication system in accordance with the invention.

FIG. 2 illustrates a block diagram of an exemplary communication system in accordance with the invention. The system illustrated may be embodied as a cellular network 100 containing a plurality of mobile phone cells 130 for example. In FIG. 2, there is illustrated an independent emergency broadcast station 105 whose primary function is to transmit messages in case of severe situations such as weather conditions, fire, flooding, outbreak of war or terrorist activity, etc. When a situation occurs, the emergency broadcast station 105 sends a signal 150a to at least one base station 115 (or base stations if the emergency situation spans a larger area then cell 130 of the network 100).

The emergency broadcast station 105 creates a digital signal 150a that represents the emergency broadcast message. For example, the first three bits of the signal 150a may represent the severity (i.e. $2^3=8$ bits or frequencies) and then a following X number of bits of signal 150a may represent the frequency in kHz (i.e., the next 12 bits would be $2^{12}=4096$ frequencies ranging from 1 kHz to 4096 kHz). This is merely one example of a type of encoding, since there are literally millions of combinations on how to encode the priority and frequency of the signal, as is known in the art. Additionally, in order to account for any mobile cell phones in the base station's coverage area that do not have a low-frequency tuning option (i.e., the cell phone is not compatible, was manufactured without or was not retrofitted with the tuning feature), a 1-800 number could be transmitted as is known in the art, in parallel or together with the signal 150a.

The signal 150a sent from the emergency broadcast station 105 to the base station 115 is a digital signal transmitted through a transmission line or on a cellular channel. The emergency broadcast station 105 knows which base stations to send signal 150a to because the national, state or local authorities have a database containing all local base stations' geographical locations and cellular coverage areas. Accordingly, the national, state or local authorities' computer database selects the base station(s) to be used for receiving the warning/emergency signal.

Accordingly, the base station regions, and hence subscribers, are determined by the original sender of the message (i.e., the local authority). For example, if FEMA is the originator of the emergency broadcast message intended to warn a particular region of an impending hazard, FEMA would designate the specific region and/or regions targeted for the broadcast message. A specific cellular communication service would therefore be used to delimit the geographic region(s).

The base station 115 receives the digital signal 150a via the landline or cellular channel and incorporates this signal (depicted as a signal 150b in FIG. 2 to differentiate the signal transmitted to the mobile cellular phones) onto a known channel. Signal 150b contains all of the information received in signal 150a, but is a different signal that is formatted by a suitable encoding technique known in the art before being sent to mobile stations 140, which may be embodied as mobile cellular phones. As an example, within a CDMA system, signal 150b may be incorporated into or merged with an alert with information message on the downlink traffic channel if the mobile station 140 is active, or within a channel assignment message or feature notification message in a paging channel if the mobile station 140 is only registered and idle. The present invention is not limited to incorporating signal 150b into known channels of a CDMA system, as there are a number of ways of doing this in different signal types of systems such as GSM, TDMA, UMTS, CDMA2000 and HDR systems, for example.

Accordingly, signal 150b is therefore transmitted from base station 115 to mobile stations 140, and contains the aforementioned priority (or severity) level of the disaster and frequency of the main emergency channel that users of the cellular phones 140 need to tune to in order to receive the emergency broadcast message. In order to be able to tune to the message, in an embodiment where the mobile station 140 is a cellular phone, the cellular phone 140 may have an algorithm containing a priority flag in a main cellular phone 140 processor. An interrupt flag raised by the incoming emergency signal could be directed to a particular memory location in the cellular phone 140 processor system which would contain, for example, a user's programming choice as to what to do (i.e. cut off conversation, beep, or simply to into and sound the AM channel's message). For mobile cellphones not having a low-frequency tuning capability, a 1-800 number could be displayed on a display screen of the cellular phone 140 and the user could dial this information number in order to retrieve or listen to the emergency broadcast message.

In an embodiment, a user of a mobile station 140 can program the mobile station to designate a degree of severity they want to get through. For example, in an embodiment where the mobile station 140 is a cellular phone, priority levels could be classified into five (5) levels, where level 1 represents a low priority emergency situation and level 5 represents an absolute life threatening situation. The user can program the cellular phone 140 so that in response to receiving signal 150b with priority levels 1 through 3 included therein, the cellular phone 140 emits a gentle beep as the signal 150b is received. Moreover, the cellular phone may be programmed to handle various priority levels differently, depending on the severity. For example, when signal 150b is received and includes higher levels 4 and 5, the cellular phone 140 immediately interrupts any current or ongoing cellular phone 140 communications. If cellular phone 140 is on standby, the received signal 150b may be configured so as to be automatically downloaded as a text message with a concurrent emitted beep on the cellular phone 140, enabling the user to immediately retrieve the emergency broadcast message.

Figure 3:
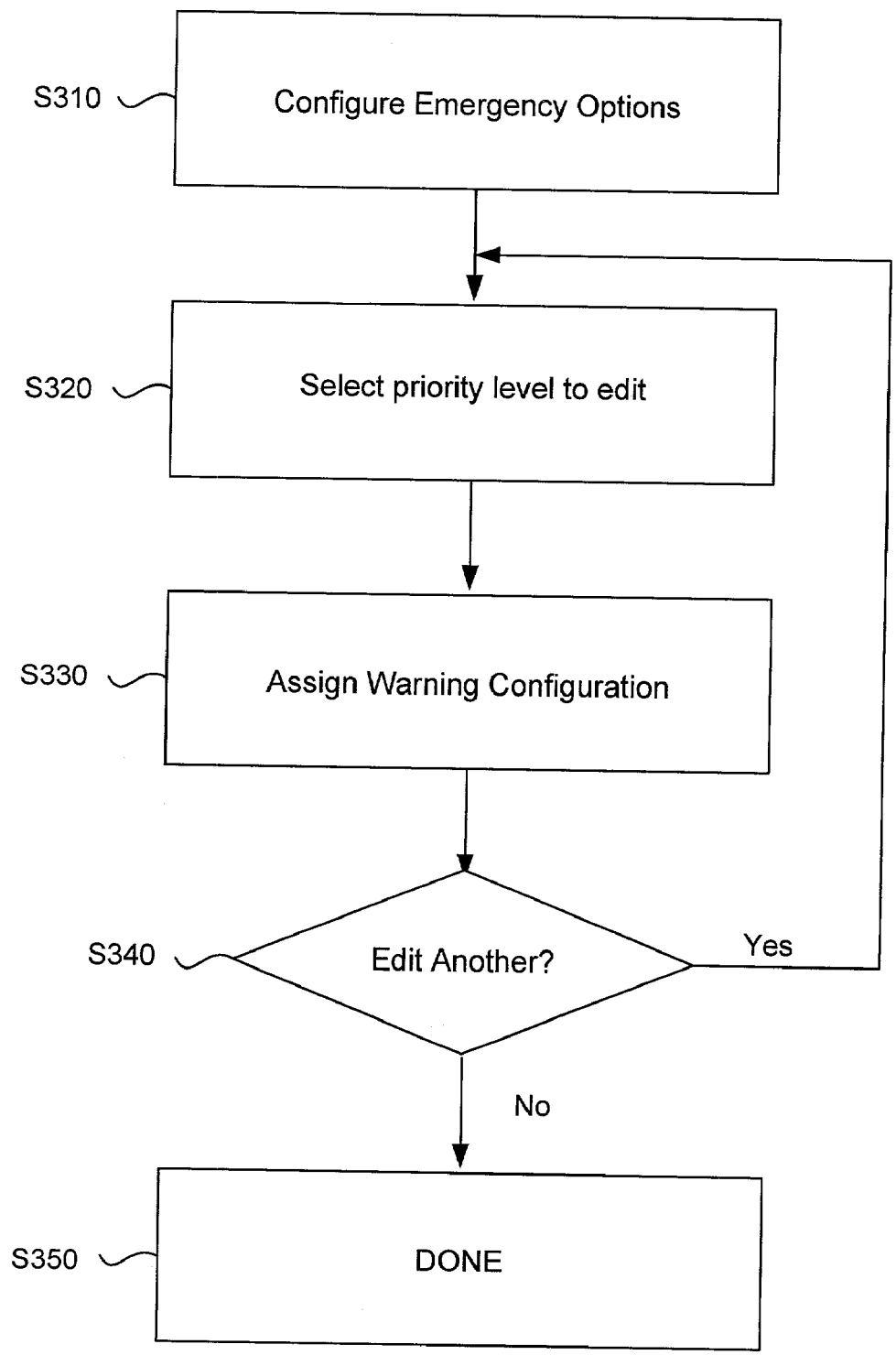
FIG. 3 is a flow diagram illustrating steps in programming a mobile cellular phone in accordance with the invention and FIG. 4 illustrates a disaster area within an exemplary communication system of the invention.

FIG. 3 is a flow diagram illustrating steps in programming the mobile cellular phone 140 in accordance with the invention. Initially, from a suitable main menu display screen on cellular phone 140, the user selects, such as by scrolling up or down, left or right, a "Configure Emergency Options" feature (step S310), which may be embodied as hypertext or a displayed cell on the screen of cellular phone 140, as is known in the art. Selection of this feature brings up a series of prompts, including a summary of current priority levels (the system may have default levels preset at manufacture if these have not been set by the user) and including a prompt to select a priority level to edit (step S320). Here, the user may assign a particular warning configuration (step S330) based on the severity, and in an embodiment may select from a plurality of choices, including varying decibel levels of beeping, text message interruptions, emergency break-in of pending conversation, etc. The user is then prompted to select another priority level (step S340) or may select a DONE cell (step S350) to end the editing session. Accordingly, priority flags in the main cellular phone 140 processor are assigned to each of the user's selections, and any incoming emergency signal 150b (raising an interrupt flag) is directed by the processor to a particular memory location in the cellular phone 140 processor system which contains the selected priority flag, and hence priority level notification corresponding to the priority level contained in the incoming emergency signal 150b.

Figure 4:
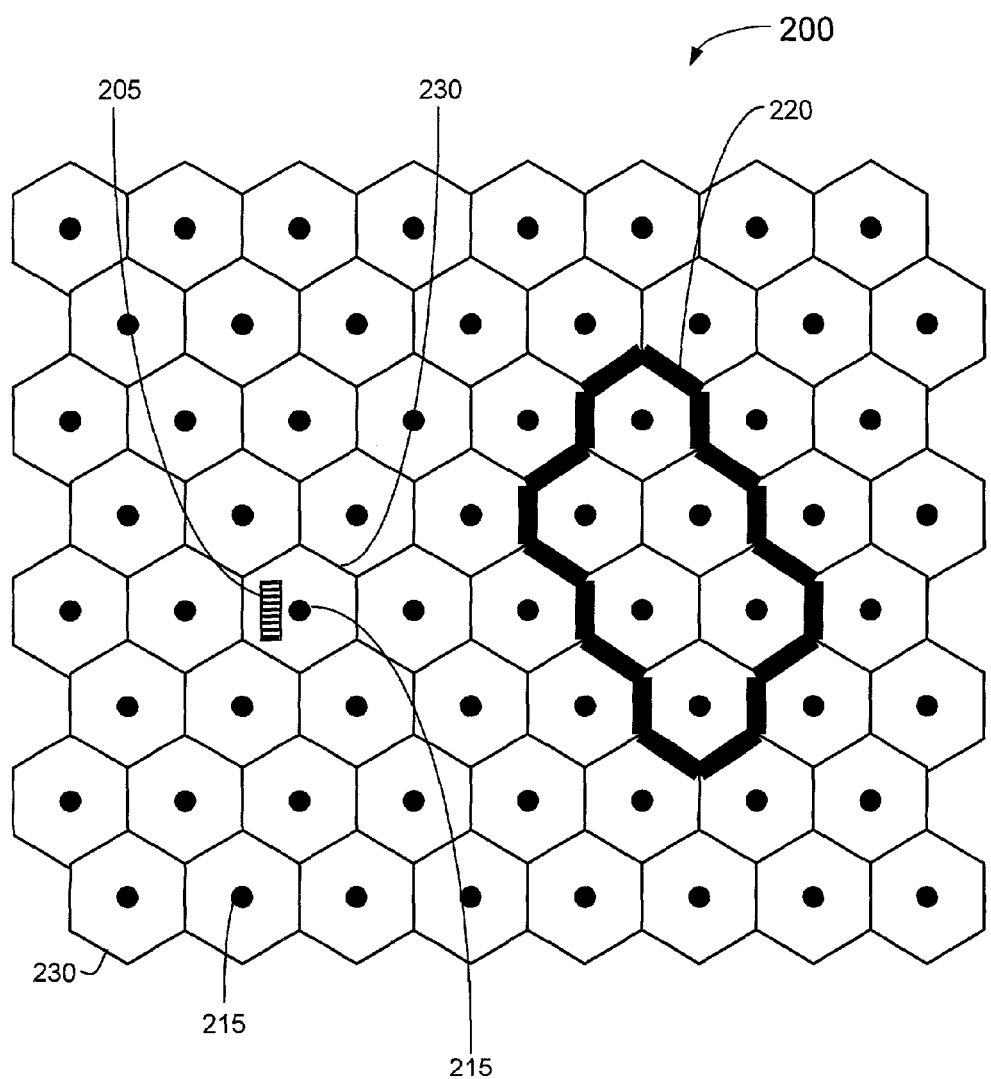

FIG. 4 illustrates a disaster area within an exemplary communication system of the invention. In FIG. 4, there is a local emergency zone 220 within an existing cellular network 200. The public emergency message generated by emergency broadcast station 205 could be related to a disaster such as flooding or a tornado, for example, which in either case could be geographically confined to a few mobile phone cells 230. The use of an already existing network 200 of base stations 215 within these cells 230 enables a more efficient localization of emergency broadcast messages to people in possession of cellular phones (not shown) that subscribe to network 200. Moreover, users of cell phones are also more likely to be mobile and more prone to not knowing about a sudden emergency. Accordingly, by utilizing the method and system of the invention, cell phone users may be conveniently and efficiently warned.

The invention being thus described, it will be obvious that the same may be varied in many ways. For example, the system may be adapted to pagers in addition to mobile cellular phones. For pagers, alpha-numeric messages can be transmitted, or a 1-800 number can be transmitted to the pager display screen so that he user can call the number and retrieve the emergency information necessary to avoid or avert disaster. Additionally, the base station 115 may utilize known short messaging service (SMS) techniques to generate a message upon receiving the signal 150a from emergency broadcast station 105. The SMS message would be forward to all mobile cellular phone 140 in the base station's 115 serving area.

Additionally, the functional blocks in FIGS. 1–4 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s). Such variations are not to be regarded as departure from the spirit and scope of the invention, and all such modifications as would be obvious to one skilled in the art are intended to be included within the scope of the following claims.

What is claimed is:

1. A method of distributing emergency warning messages from a broadcast station in a communication system, comprising:
   generating an emergency broadcast message of a current or impending emergency from the broadcast station; and
   transmitting an emergency information signal representing the emergency broadcast message to at least one base station, the emergency information signal including at least one of a plurality of priority levels indicating the severity of the current or impending emergency therein, the transmitted emergency information signal increasing in tone or volume based on the corresponding increase in the severity of the priority level included therein.

2. The method of claim 1, further comprising transmitting a signal containing the emergency information to users served by the at least one base station.

3. The method of claim 1, wherein the signal is transmitted from the base station to one or more mobile stations at a gentle beep at lower priority levels, and is adapted to interrupt a current conversation at said one or more mobile stations with a louder beep and/or by displaying an urgent text message at higher priority levels.

4. A method of distributing signals representing emergency warning messages in a communication system, comprising:
   receiving an emergency information signal representing an emergency broadcast message of a current or impending disaster, at a base station; and
   transmitting a signal to users served by the base station the signal including at least one of a plurality of priority levels indicating the severity of the current or impending emergency therein, the transmitted signal increasing in tone or volume based on the corresponding increase in the severity of the priority level included therein.

5. The method of claim 4, wherein the signal includes a frequency of an accessible main emergency channel, the method further comprising tuning to the frequency to receive the emergency broadcast message.

6. The method of claim 4, said receiving including receiving the emergency information signal from an emergency broadcast station that generates the emergency broadcast message.

7. The method of claim 4, wherein the signal is transmitted from the base station to one or more users at a gentle beep at lower priority levels, and is adapted to interrupt a current conversation at said one or more mobile stations with a louder beep and/or by displaying an urgent text message at higher priority levels.

8. A method of receiving emergency warning messages at one or more mobile stations in a communication system, comprising:
   receiving a signal representing an emergency broadcast message of a current or impending disaster, the received signal increasing in tone or volume based a corresponding increase in the severity of a priority level included in the received signal which indicates the severity of the current or impending emergency; and
   tuning to a frequency of an accessible main emergency channel included within the signal to receive the emergency broadcast message.

9. The method of claim 8, said receiving including receiving the signal from a base station serving the mobile stations.

10. The method of claim 8, wherein the signal is received as a gentle beep at lower priority levels, and is adapted to interrupt a current conversation at the mobile station with a louder beep and/or by displaying an urgent text message at higher priority levels.

11. A method of receiving emergency warning messages at one or more mobile stations in a communication system, comprising:
   receiving a signal representing an emergency broadcast message of a current or impending emergency, the signal changing in accordance with one or more priority levels indicating the severity of the current or impending disaster; and
   handling the signal differently depending on the severity of the received priority level as indicated by the change in one of a tone or volume of the signal,
   wherein the tone or volume of the received signal increases based on a corresponding increase in severity of the priority level.

12. The method of claim 11, wherein said signal is received as a gentle beep at lower priority levels, and is adapted to interrupt a current conversation at the one or more mobile stations with a louder beep and/or by displaying an urgent text message at higher priority levels.

13. The method of claim 11, wherein said receiving includes
   receiving a frequency of an accessible main emergency channel that is included in the signal; and
   tuning to the frequency to receive the emergency broadcast message.

14. The method of claim 13,
   wherein said at least one or more mobile stations are mobile cellular phones, and
   wherein said handling includes downloading a text message of the frequency and priority level, and beeping when the mobile cellular phone is on standby.

15. A method of distributing signals representing emergency warning messages in a communication system, comprising:
   receiving an emergency information signal representing an emergency broadcast message of a current or impending emergency, at a base station; and
   transmitting a signal including at least one of a plurality of priority levels indicating the severity of the current or impending emergency therein to one or more users served by the base station, the signal changing based on the priority level included therein,
   wherein the emergency information signal is transmitted as a gentle beep at lower priority levels, and is adapted to interrupt a current conversation at the mobile station with a louder beep and/or by displaying an urgent text message at higher priority levels.

16. A method of receiving emergency warning messages at one or more mobile stations in a communication system, comprising:
   receiving a signal representing an emergency broadcast message of a current or impending emergency, the signal changing in accordance with one or more priority levels indicating the severity of the current or impending disaster; and
   handling the signal differently depending on the severity of the received priority level as indicated by the change in signal,
   wherein said signal is received as a gentle beep at lower priority levels, and is adapted to interrupt a current conversation at the one or more mobile stations with a louder beep and/or by displaying an urgent text message at higher priority levels.

* * * * *